United States Patent
Nair et al.

(10) Patent No.: US 11,991,190 B2
(45) Date of Patent: May 21, 2024

(54) COUNTERACTIONS AGAINST SUSPECTED IDENTITY IMPOSTURE

(71) Applicant: Nokia Technologies Oy, Espoo (FI)

(72) Inventors: Suresh Nair, Whippany, NJ (US); Anja Jerichow, Grafing bei München (DE); Nagendra S Bykampadi, Bangalore (IN)

(73) Assignee: NOKIA TECHNOLOGIES OY, Espoo (FI)

(*) Notice: Subject to any disclaimer, the term of this patent is extended or adjusted under 35 U.S.C. 154(b) by 324 days.

(21) Appl. No.: 17/603,528

(22) PCT Filed: Apr. 7, 2020

(86) PCT No.: PCT/EP2020/059880
§ 371 (c)(1),
(2) Date: Oct. 13, 2021

(87) PCT Pub. No.: WO2020/212202
PCT Pub. Date: Oct. 22, 2020

(65) Prior Publication Data
US 2022/0217161 A1 Jul. 7, 2022

(30) Foreign Application Priority Data

Apr. 15, 2019 (IN) .............................. 201941015116

(51) Int. Cl.
*H04L 9/40* (2022.01)

(52) U.S. Cl.
CPC ...... *H04L 63/1416* (2013.01); *H04L 63/0876* (2013.01); *H04L 63/1425* (2013.01); *H04L 63/20* (2013.01)

(58) Field of Classification Search
CPC ............. H04L 63/1416; H04L 63/0876; H04L 63/1425; H04L 63/20; H04L 63/1458;
(Continued)

(56) References Cited

U.S. PATENT DOCUMENTS

| 2003/0186681 A1* | 10/2003 | Gabor | H04L 63/108 |
| | | | 380/247 |
| 2016/0006726 A1* | 1/2016 | Mizikovsky | H04L 63/061 |
| | | | 713/171 |

FOREIGN PATENT DOCUMENTS

| EP | 2876915 A1 | 5/2015 |
| EP | 3264686 A1 | 1/2018 |

(Continued)

OTHER PUBLICATIONS

"3rd Generation Partnership Project; Technical Specification Group Core Network and Terminals; Non-Access-Stratum (NAS) functions related to Mobile Station (MS) in idle mode (Release 16)", 3GPP TS 23.122, V16.1.0, Mar. 2019, pp. 1-66.

(Continued)

*Primary Examiner* — Mohammed Waliullah
(74) *Attorney, Agent, or Firm* — Robert P. Michal, Esq.; Carter, DeLuca & Farrell LLP

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to establish a user equipment context for a user equipment registered with the apparatus, the user equipment context being associated with an identity of the user equipment, determine that a plurality of network messages comprising the identity of the user equipment as sender fail a network message integrity process, and trigger, responsive to the determination, at least one of: 1) sending a paging message to the user equipment, and 2) initiating an authentication process with a sender of the network messages, and deletion the user equipment (Continued)

context as a response to successful completion of the authentication process.

1 Claim, 6 Drawing Sheets

(58) Field of Classification Search
CPC .. H04W 12/06; H04W 12/106; H04W 12/122
See application file for complete search history.

(56) References Cited

FOREIGN PATENT DOCUMENTS

| | | |
|---|---|---|
| EP | 1932276 B1 | 3/2019 |
| GB | 2429607 A | 2/2007 |
| WO | 2018/037149 A1 | 3/2018 |
| WO | 2018/089442 A2 | 5/2018 |
| WO | WO-2020035441 A1 * | 2/2020 ........... H04L 9/0643 |

OTHER PUBLICATIONS

"3rd Generation Partnership Project; Technical Specification Group Services and System Aspects; Security architecture and procedures for 5G system (Release 15)", 3GPP TS 33.501, V15.4.0, Mar. 2019, pp. 1-187.

Kim et al., "Touching the Untouchables: Dynamic Security Analysis of the LTE Control Plane", IEEE Symposium on Security and Privacy (SP), May 19-23, 2019, 16 pages.

"3rd Generation Partnership Project; Technical Specification Group Services and System Aspects; 3GPP System Architecture Evolution (SAE); Security architecture (Release 15)", 3GPP TS 33.401, V15.7.0, Mar. 2019, pp. 1-163.

"3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401, V16.2.0, Mar. 2019, pp. 1-418.

International Search Report and Written Opinion received for corresponding Patent Cooperation Treaty Application No. PCT/EP2020/059880, dated Oct. 1, 2020, 19 pages.

Vrakas et al., "Evaluating the Security and Privacy Protection Level of IP Multimedia Subsystem Environments", IEEE Communications Surveys & Tutorials, vol. 15, No. 2, Second Quarter 2013, pp. 803-819.

Zhao et al., "A Graph-Based QoS-Aware Resource Management Scheme for OFDMA Femtocell Networks", IEEE Access, vol. 6, Dec. 6, 2017, pp. 1870-1881.

Office Action received for corresponding European Patent Application No. 20718281.7, dated Nov. 10, 2022, 8 pages.

* cited by examiner

Establishing, in an apparatus, a user equipment context for a user equipment registered with the apparatus, the user equipment context being associated with an identity of the user equipment — 510

Determining that a plurality of network messages comprising the identity of the user equipment as sender fail a network message integrity process — 520

Triggering, responsive to the determination, at least one of: 1) sending of a paging message to the user equipment, and 2) an authentication process with a sender of the network messages, and deletion of the user equipment context as a response to successful completion of the authentication process — 530

FIGURE 5

COUNTERACTIONS AGAINST SUSPECTED IDENTITY IMPOSTURE

RELATED APPLICATION

This application claims priority to PCT Application No. PCT/EP2020/059880, filed on Apr. 7, 2020, which claims priority to Indian Application No. 201941015116, filed on Apr. 15, 2019, each of which is incorporated herein by reference in its entirety.

FIELD

The present disclosure relates to management of devices in communication networks, such as cellular communication networks, for example.

BACKGROUND

Communication networks, such as cellular networks, may operate on the basis of subscriptions, such that only legitimate, authorized users are given access to the network. Once a user is registered in the network, he may access the services of the network.

Attacks by malicious parties may seek to compromise aspects of the network. For example, attackers may seek to eavesdrop on communications conveyed over the network, or simply to disable the network, at least partially, to make it less useful to the authorized users.

SUMMARY

According to some aspects, there is provided the subject-matter of the independent claims. Some embodiments are defined in the dependent claims.

According to a first aspect of the present disclosure, there is provided an apparatus comprising at least one processing core, at least one memory including computer program code, the at least one memory and the computer program code being configured to, with the at least one processing core, cause the apparatus at least to establish a user equipment context for a user equipment registered with the apparatus, the user equipment context being associated with an identity of the user equipment, determine that a plurality of network messages comprising the identity of the user equipment as sender fail a network message integrity process, and trigger, responsive to the determination, at least one of: 1) sending a paging message to the user equipment, and 2) initiating an authentication process with a sender of the network messages, and deletion the user equipment context as a response to successful completion of the authentication process.

According to a second aspect of the present disclosure, there is provided an apparatus comprising at least one processing core, at least one memory including computer program code, the at least one memory and the computer program code being configured to, with the at least one processing core, cause the apparatus at least to register with a core network device, determine that a registration state of the apparatus with the core network device has become corrupted, and trigger, responsive to the determination, an attachment process with the core network device.

According to a third aspect of the present disclosure, there is provided a method comprising establishing, in an apparatus, a user equipment context for a user equipment registered with the apparatus, the user equipment context being associated with an identity of the user equipment, determining that a plurality of network messages comprising the identity of the user equipment as sender fail a network message integrity process, and triggering, responsive to the determination, at least one of: 1) sending a paging message to the user equipment and 2) initiating an authentication process with a sender of the network messages, and deletion of the user equipment context as a response to successful completion of the authentication process.

According to a fourth aspect of the present disclosure, there is provided a method, comprising registering, by an apparatus, with a core network device, determining that a registration state of the apparatus with the core network device has become corrupted, and triggering, responsive to the determination, an attachment process with the core network device.

According to a fifth aspect of the present disclosure, there is provided an apparatus comprising means for establishing, in an apparatus, a user equipment context for a user equipment registered with the apparatus, the user equipment context being associated with an identity of the user equipment, means for determining that a plurality of network messages comprising the identity of the user equipment as sender fail a network message integrity process, and means for triggering, responsive to the determination, at least one of: 1) an authentication process with a sender of the network messages, and deletion of the user equipment context as a response to successful completion of the authentication process, and 2) sending a paging message to the user equipment.

According to a sixth aspect of the present disclosure, there is provided an apparatus comprising means for registering, by an apparatus, with a core network device, means for determining that a registration state of the apparatus with the core network device has become corrupted, and means for triggering, responsive to the determination, an attachment process with the core network device.

According to a seventh aspect of the present disclosure, there is provided a non-transitory computer readable medium having stored thereon a set of computer readable instructions that, when executed by at least one processor, cause an apparatus to at least establish, in an apparatus, a user equipment context for a user equipment registered with the apparatus, the user equipment context being associated with an identity of the user equipment, determine that a plurality of network messages comprising the identity of the user equipment as sender fail a network message integrity process, and trigger, responsive to the determination, at least one of: 1) sending a paging message to the user equipment and 2) an authentication process with a sender of the network messages, and deletion of the user equipment context as a response to successful completion of the authentication process.

According to an eighth aspect of the present disclosure, there is provided a non-transitory computer readable medium having stored thereon a set of computer readable instructions that, when executed by at least one processor, cause an apparatus to at least register with a core network device, determine that a registration state of the apparatus with the core network device has become corrupted, and trigger, responsive to the determination, an attachment process with the core network device.

According to a ninth aspect of the present disclosure, there is provided a computer program configured to cause at least the following, when run on a computer: establish, in an apparatus, a user equipment context for a user equipment registered with the apparatus, the user equipment context being associated with an identity of the user equipment, determine that a plurality of network messages comprising the identity of the user equipment as sender fail a network message integrity process, and trigger, responsive to the determination, at least one of: 1) sending a paging message to the user equipment and 2) an authentication process with a sender of the network messages, and deletion of the user equipment context as a response to successful completion of the authentication process.

According to a tenth aspect of the present disclosure, there is provided a computer program configured to cause at least the following, when run on a computer: register with a core network device, determine that a registration state of the apparatus with the core network device has become corrupted, and trigger, responsive to the determination, an attachment process with the core network device.

According to an eleventh aspect of the present disclosure, there is provided a computer program configured to cause a method according to the third aspect to be performed, when run on a computer.

According to a thirteenth aspect of the present disclosure, there is provided a computer program configured to cause a method according to the fourth aspect to be performed, when run on a computer.

BRIEF DESCRIPTION OF THE DRAWINGS

FIG. 5 is a flow graph of a method in accordance with at least some embodiments of the present invention.

EMBODIMENTS

Procedures are disclosed herein aimed to make it more difficult for an attacker mounting a denial of service, DoS, attack to manipulate a communication network to delete a user equipment, UE, context by sending spurious messages into the network. Further, signalling optimizations are disclosed which eliminate, in certain situations, the need for a full authentication procedure by paging a UE instead.

Figure 1:
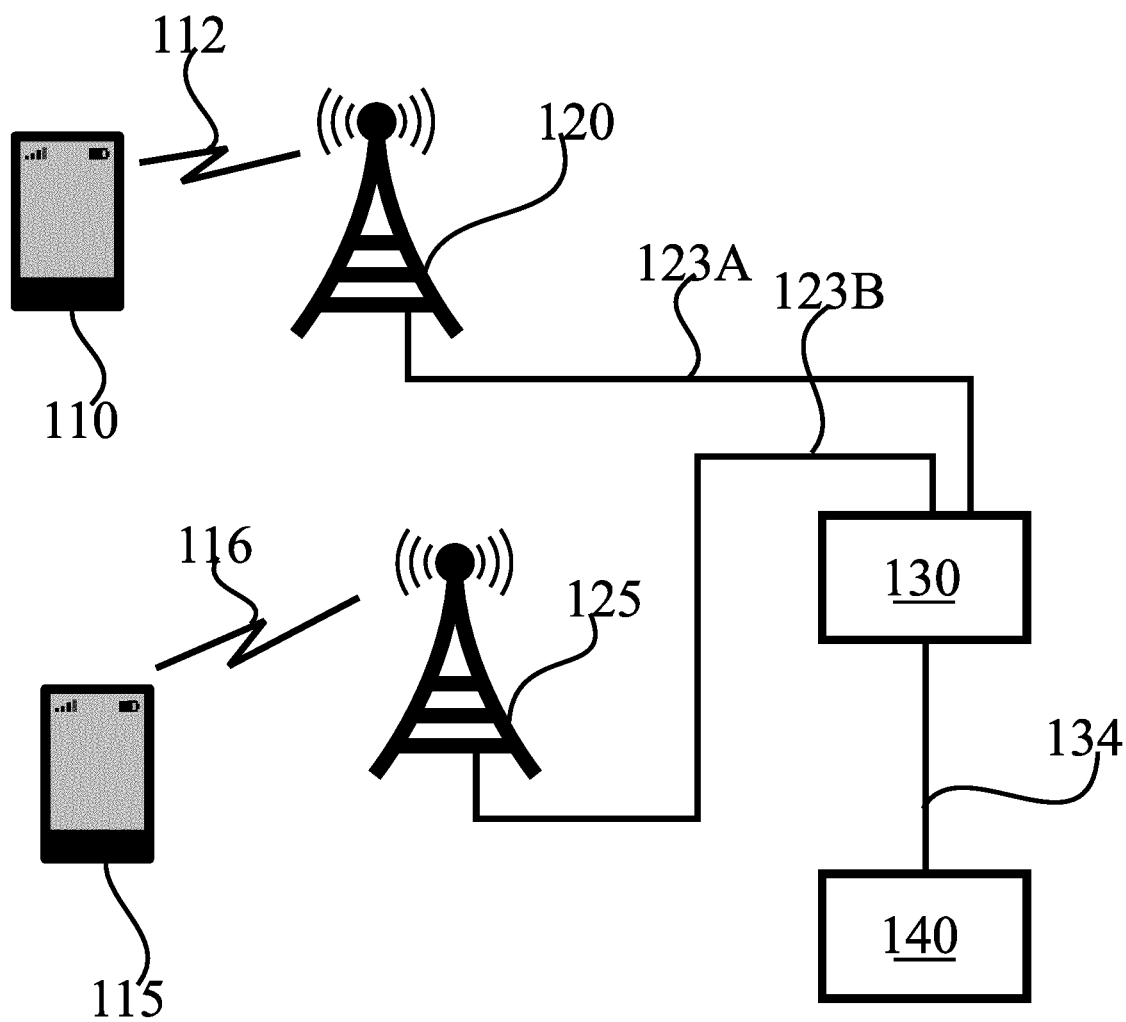
FIG. 1 illustrates an example system in accordance with at least some embodiments of the present invention.

FIG. 1 illustrates an example system in accordance with at least some embodiments of the present invention. The illustrated system comprises user equipment, UE, 110. UE 110 may comprise a smartphone, a feature phone, a cellular telephone, a tablet computer, a laptop computer, a desktop computer, or an Internet of Things, IoT, node such as a smart utility meter or a networked module of an automobile, for example.

UE 110 is in communication with base station 120 via radio link 112. UE 110 and base station 120 may be comprised in a cellular communication system, such as fifth generation, 5G, also known as New Radio, NR, or long term evolution, LTE, for example. Alternatively a non-cellular system could be used, in which case unit 120 might be referred to as an access point, however, in the present disclosure the term "base station" is used for the sake of simplicity, not excluding access points of non-cellular systems, such as wireless local area network, WLAN, or worldwide interoperability for microwave access, WiMAX, for example. Radio link 112 may comprise a downlink for communicating from the base station toward the UE, and an uplink for communicating from the UE to the base station. When the UE is in idle mode, radio link 112 may be less active than when the UE is active.

Base station 120 is configured to operate in accordance with a same communication standard as UE 110 and radio link 112, to achieve interoperability. Base station 120 is interfaced with mobility management entity, MME, 130 via connection 123A. The MME is a terminological choice used in the present disclosure, as the skilled person will understand the name of a specific node in a communication network may depend on the technology used. For example, in 5G networks, a node tasked with functions similar to those of an MME in LTE networks is called an access and mobility function, AMF, and such embodiments are not to be seen as outside of the scope of the present disclosure due to the use of the expression "MME 130". In general, the MME is configured to control an access network, where base stations are comprised. The MME is responsible for paging, bearer (de)activation processes, selecting serving gateways, and the MME also terminates non-access stratum, NAS, messages. The MME is also responsible for generation and allocation of temporary identities to UEs. It participates in checking the authorization of UEs to camp on the network, and enforces UE roaming restrictions, if such are configured.

A NAS layer is used, for example, to manage the establishment of communication sessions and for maintaining continuous communications with the UE as it moves in the network coverage area. The NAS is defined in contrast to the access stratum, AS, which carries information over the radio links of the network. A further description of NAS is that it is a protocol for messages passed between the UEs, and the core network, for example the MME in the core network. Such messages are passed transparently through the radio network in that the endpoints of NAS messaging are the UE and the MME, and radio network nodes, such as base stations, do not modify these messages but convey them back and forth between the UE and MME.

MME 130 is interfaced with home subscriber server, HSS, 140 via connection 134. As was the case with the MME, also here a different name for this node may be used in different technologies, for example in 5G a node known as a unified data management function, UDM, performs functions similar to those of a HSS in LTE technology. Using the expression "HSS" is not to be understood as a limitation to technologies which use this specific terminology. The HSS is a central database that stores user- and subscription-related information. The functions of the HSS include mobility management, call and session establishment support, user authentication and access authorization.

Normal communication networks, such as cellular communication networks, comprise further nodes which are not illustrated in FIG. 1 for the sake of clarity and conciseness. The network may comprise more than one MME and/or HSS.

In use, UE 110 may be configured to transmit an attachment request to the network, for example as a response to being switched on from a power-off condition. The attachment request may be sent over radio link 112, via base station 120 and connection 123A to MME 130. The attachment request may comprise an identity of a subscription active in UE 110, for example an international mobile subscriber identity, IMSI, which is a permanent subscriber identity.

As a response to the attachment request, the network may participate in an attachment procedure with UE 110. This procedure may comprise a UE authentication process, which may involve HSS 140 and secret information securely stored in UE 110, for example in a smart card therein. Examples of such UE authentication procedures include an authentication and key agreement, AKA, security protocol in accordance with LTE or 5G technology.

As a response to successful authentication and attachment to the network, MME 130 may store a UE context for UE 110. In this situation, the UE is registered with the MME. The UE context may store a temporary identity of the UE, such as, for example, an system architecture evolution, SAE, temporary mobile subscription identity, S-TMSI. The UE context may further store, for example, parameters of an internet protocol bearer service, network internal routing information, UE terminal capabilities and/or subscription information downloaded into MME 130 from HSS 140. Storing the information locally in MME 130 enables faster completion of procedures, such as bearer establishment, which would otherwise require messaging with HSS 140. The UE context may further store dynamically changing information, for example lists of bearers which are active for UE 110. MME 130 may be configured to retain the UE context during periods when UE 110 is idle.

NAS messages sent from the UE side to MME 130 may be integrity protected, by which it is meant that the contents of NAS messages are secured against tampering. The contents may be cryptographically signed using a key, for example, to enable a recipient of the node to determine the true originator of the message is the node whose identity is comprised as sender in the NAS message, and also that the contents of the message have not been modified by other nodes. This may be accomplished using secret keying material established in connection with the authentication process, for example. A simple form of NAS integrity enforcement is counters kept in the uplink and/or downlink direction, such that each uplink NAS message should comprise the next uplink counter value, and likewise each downlink NAS message should comprise the next downlink counter value.

A denial of service, DoS, attack may take many forms, but a common theme in DoS attacks is that they seek to prevent use of a service or system by its legitimate users. For example, a web server may be flooded with so many spurious requests that it has difficulty serving real users. In a communication network setting, a maliciously acting UE, illustrated as UE 115 in FIG. 1, may issue forged NAS messages into the network, via radio link 116 and base station 125. Radio link 116 may resemble radio link 112. Base station 125 may resemble base station 120. In some cases both UE 110 and UE 115 may be in communication with the same base station.

Usually malicious actors such as the UE 115, observe the activity of genuine UE 110 and mount the DoS attack when UE 110 is in Idle mode. In the active mode, the UE is engaged in active communication with the network, so any message sent by the malicious actor will fail the security check and hence will be discarded by the base station or MME. Hence the malicious actors will try to mount the DoS attacks when the UE 110 is in Idle mode. The Idle mode procedures and behaviour of the UE are well specified in specifications 3$^{rd}$ generation partnership project, 3GPP, TS 23.300 and 3GPP 23.401. In general a UE in Idle mode may be only listening to broadcast messages at certain intervals. Hence a genuine UE may be unaware if some other UE sends any message to the network ostensibly on its behalf.

In case UE 115 gains knowledge of an identity of UE 110, for example the IMSI or the temporary identity of UE 110, such as the S-TMSI, it may send spurious NAS messages bearing this identity as sender. By this it is meant, that the message comprises the identity in a protocol field which receives the identity of the sender of the message. In other words, UE 115 sends spoofed messages by intentionally indicating another node as the sender. Where UE 115 does not gain knowledge of a valid temporary identity, it may simply guess identities and send spurious messages into the network. While UE 115 may not be able to furnish these spurious NAS messages with the correct integrity protection, since it will not, in general, have the secret information (for example integrity key $K_{NAS\ int}$ and encryption key $K_{NAS\ enc}$ as defined in 3GPP specification TS 33.401) needed for this, the network, for example the MME, will see plural NAS messages apparently originating from UE 110, which fail the NAS integrity process.

The MME may be configured to determine that a plurality of network messages, such as NAS messages, comprising the identity of UE 110 as sender fail a network message integrity process, such as the NAS integrity verification process. For example, the MME may determine this in case more than a predetermined number of such messages fails the integrity process within a preconfigured length of time. For example, at least 50 messages failing the NAS integrity process in one minute, or at least ten messages in ten seconds.

In case the MME were to delete the UE context of UE 110 as a response to this determination (for example, assuming the UE has become confused as to the information in the UE context, causing the integrity protection to fail), the maliciously acting UE 115 would succeed in deleting the context of UE 110, knowing only the identity. UE 110, a legitimate user, would be left in a poorly defined state, as the UE would assume the UE context is in the MME, and that the UE is registered in the network. Therefore, the MME may keep the UE context even though NAS messages ostensibly from UE 110 are failing the integrity process.

Instead of deleting the UE context, MME 130 may trigger an (re-)authentication process, seeking to re-establish or verify the UE context. In case the authentication process is performed with the malicious UE 115, it will fail since this UE will not, in general, have the secret subscription-related information needed to participate in an authentication process. In accordance with embodiments of the present disclosure, the MME may be configured to keep the UE context in case this happens. In case the (re-)authentication is performed with UE 110 and completes successfully, the UE context in MME 130 is updated to reflect the new authentication. In some embodiments, the UE context is deleted and re-established after the authentication process successfully completes, establishing UE 110 is authentic. The MME may choose to perform the authentication process with either the sender of the NAS messages failing integrity protection, or with UE 110, which should be reachable using information in the UE context. In some embodiments, the MME may trigger authentication processes with both UEs.

As an alternative, before triggering the authentication process(es), MME 130 may page UE 110, that is, the UE whose identity is indicated as sender of the NAS messages failing integrity testing. The paging may be based on information in the UE context, such as the tracking area. This will cause UE 110 to become active and respond to the MME, for example with a NAS message with correct integrity protection. This may comprise or trigger a NAS-level re-keying procedure between the UE and the MME. This will enable the MME to determine that the genuine UE 110 still has the uncorrupted context information, and consequently the MME may also conclude that the NAS messages failing integrity protection likely originate in a malicious UE, which may be ignored.

A benefit of the paging without authentication is that the authentication process, which may involve a relatively intensive signalling process in the network, may be avoided in case the paging succeeds in establishing the UE context remains valid. In case the authentication(s) is performed, the DoS attacker might even see his attack as partially successful, as it causes the signalling load in the network to increase. In particular, increasing the number of authentications may increase the load of HSS 140. Although an authentication process with the malicious UE will fail, it will nonetheless cause signalling traffic in the network.

UE 110, for its part, as described above, is configured to authenticate itself with the network and to cause the UE context to the stored in MME 130, thus becoming registered with the MME and the network more broadly. In some embodiments UE 110 may determine that its registration state with the network becomes corrupted, or at least that the network may have doubts as to the validity of the registration. For example, if NAS message counters appear to be confused, the UE may determine the registration state has become corrupted. The UE may determine the counters are corrupted from its loss of memory or repeated integrity fail message indication from MME, or from absence of expected responses from MME, for example.

As a response to the determination, UE 110 may be configured to initiate a (re-) attachment procedure, such as a new registration request as if from power-on, to the network, for example the MME. Upon successful authentication and establishment of a security context, a new UE context is established and used. The old UE context may then be deleted in MME 130 as a normal housekeeping task, for example. The (re-)attachment request may be provided with no cause value, for example.

A benefit of these embodiments where the UE determines registration state corruption is that the MME may ignore all NAS messages which fail the integrity process. It is, in these embodiments, the task of the UE to maintain the UE context in the MME in the face of DoS attacks involving spurious NAS messages. In a variant of this UE process, the MME may be configured to send, responsive to determining the plurality of integrity-process failing NAS messages, a message, such as for example a page, (re-)authentication request or a request for a NAS message, to the UE to check, if the legitimate UE is still reachable and correctly registered.

Figure 2:
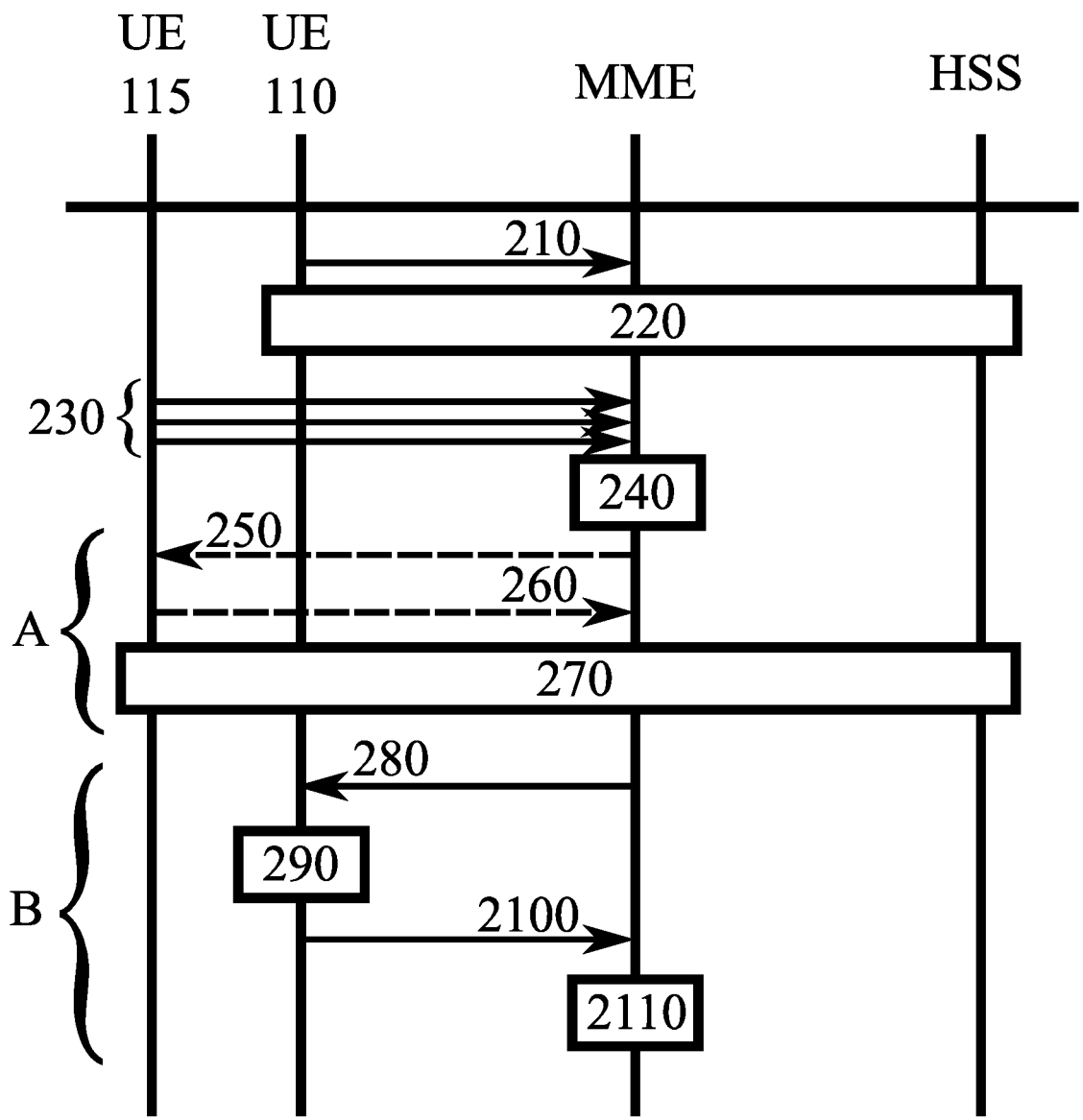
FIG. 2 illustrates signalling in accordance with at least some embodiments of the present invention.

FIG. 2 illustrates signalling in accordance with at least some embodiments of the present invention. On the vertical axes are disposed, from the left, malicious UE 115, legitimate UE 110, MME 130 and HSS 140 of FIG. 1. Time advances from the top toward the bottom. Signalling between UEs and the core network, such as the MME and the HSS, traverses base stations, as illustrated in FIG. 1.

In phase 210, UE 110 transmits an initial attachment request to the network, to the MME. Responsively, a UE authentication procedure, including communicating with the HSS, is carried out in phase 220. Subsequently, the UE context of UE 110 is stored in the MME.

In phase 230, the malicious UE 115 begins transmitting a plurality of spurious NAS messages comprising the temporary identity of UE 110 as sender. In phase 240 the MME determines that plural NAS messages arrive, ostensibly from UE 110, however they fail the NAS integrity checking process, and/or NAS counters in these messages are incorrect.

Following phase 240, at least one of: the phases labelled as "A" and the phases labelled as "B" are performed.

Phases 250, 260 and 270 are comprised in option "A". In optional phase 250, the MME requests from UE 115 its IMSI. This request may comprise the temporary identity of UE 110. Likewise optional phase 260, which is responsive to phase 250, comprises the malicious UE 115 sending back a stolen or guessed IMSI of UE 110.

The MME triggers an authentication process with the malicious UE 115. In general, this authentication process is triggered with the sender of the plurality of network messages which fail the integrity process, and which indicate the temporary identity of UE 110 as sender. This authentication process is illustrated as phase 270 in FIG. 2. As UE 115 does not have the secret cryptographic information associated with the subscription active in UE 110, the authentication will fail. The MME will not delete the UE context of UE 110. Only in case the authentication succeeds, will the MME in this embodiment delete the UE context, since a new UE context is established in connection with the authentication.

Phases 280, 290, 2100 and 2110 are comprised in option "B". In phase 280, responsive to phase 240, the MME triggers paging of UE 110, based on information in the UE context of UE 110, for example. The paging may comprise causing base stations comprised in the tracking area where UE 110 is located to page the UE, for example.

As a response to the paging, UE 110 will transition from the idle mode to an active mode, phase 290, and transmit, phase 2100, a message to the MME. This message may comprise an attachment request, for example, and/or the message may be protected using the integrity protection process, which the MME can verify. As the MME was able to reach the legitimate UE 110, and this UE was able to transmit a correctly integrity-protected NAS message to the MME, the MME can safely ignore the spurious NAS messages since the MME has verified the legitimate UE is not experiencing any problems with respect to its registration in the network.

Figure 3:
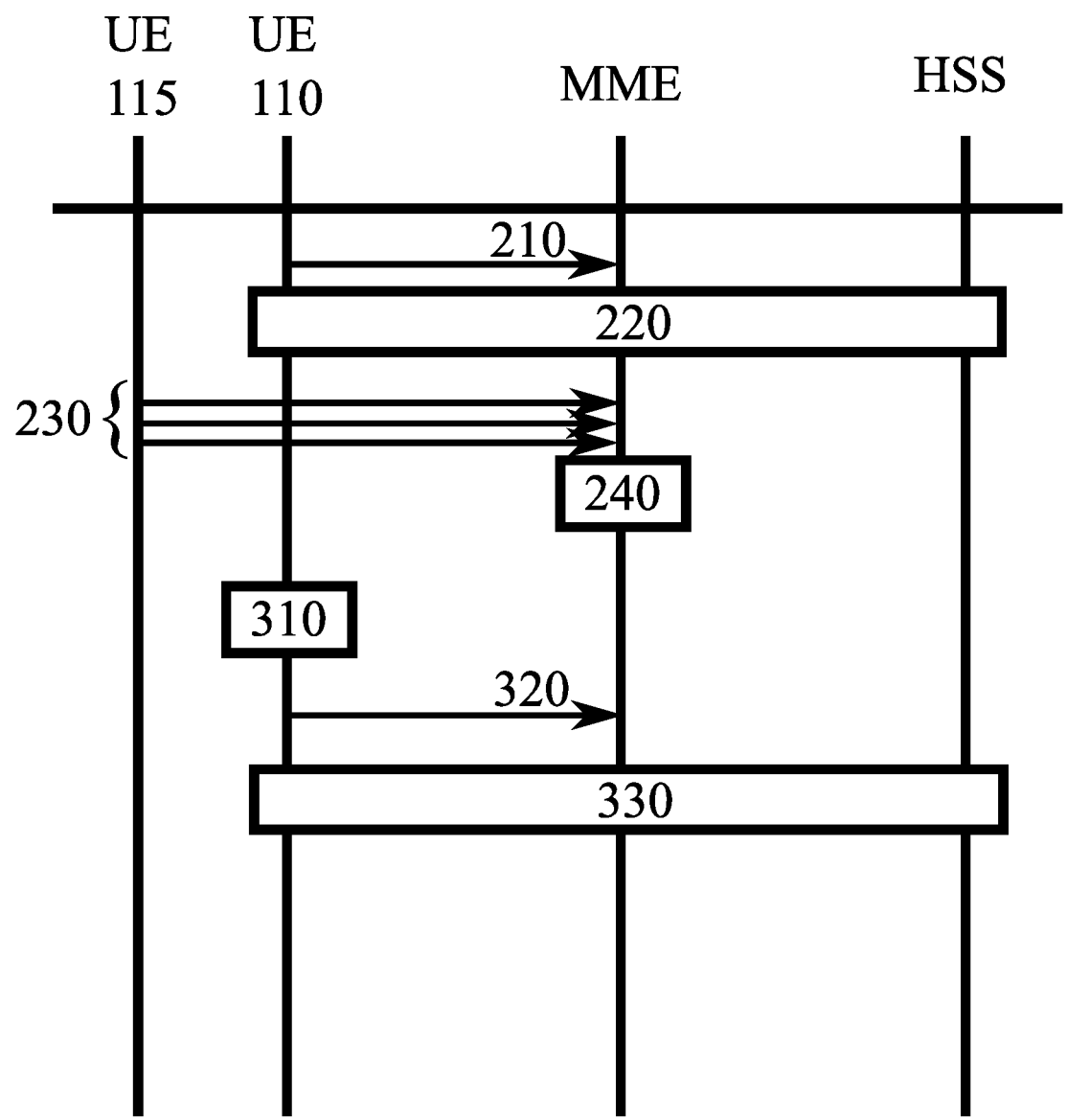
FIG. 3 illustrates signalling in accordance with at least some embodiments of the present invention

FIG. 3 illustrates signalling in accordance with at least some embodiments of the present invention. On the vertical axes are disposed, from the left, malicious UE 115, legitimate UE 110, MME 130 and HSS 140 of FIG. 1. Time advances from the top toward the bottom.

Phases 210-240 correspond to the similarly labelled phases of FIG. 2. These phases have been described herein above in connection with FIG. 2. In this embodiment, the MME ignores the NAS messages of phase 230, which fail the integrity checking process.

In phase 310, UE 110 determines that a problem has emerged with regard to its relationship with the network, for example it may determine that it has lost its security context or that context parameters, such as NAS message counters, have become corrupted. As a response to phase 310, UE 110 transmits, phase 320, an attachment request to the MME, much like UE 110 did in phase 210 in connection with initial power-on. The attachment request of phase 320 may comprise an initial attach request, for example.

The attachment request of phase 320 triggers an authentication process, phase 330, which will result in establishment of a new UE context for UE 110 in the MME. The old UE context may be deleted. In the embodiment of FIG. 3, the UE is responsible for maintaining the correct UE context in the MME. Benefits include that the MME need not become confused by the spurious integrity-failing NAS messages from malicious UE 115. Such messages may simply be discarded in the MME. It is in these embodiments the UEs responsibility to initiate a new Attach Request to the network as if from power on, if the UE finds that its messages are discarded or rejected.

Figure 4:
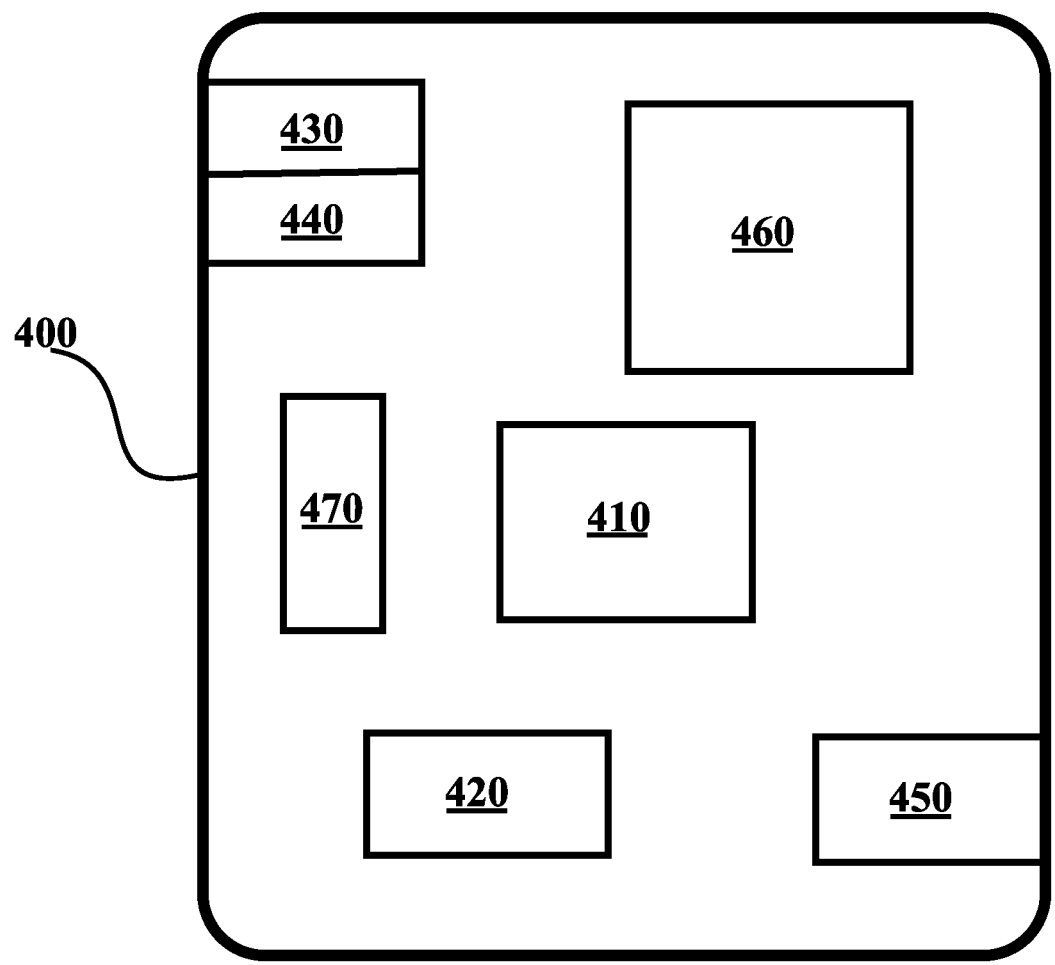
FIG. 4 illustrates an example apparatus capable of supporting at least some embodiments of the present invention.

FIG. 4 illustrates an example apparatus capable of supporting at least some embodiments of the present invention. Illustrated is device 400, which may comprise, for example, a mobile communication device such as UE 110 or, where applicable, MME 130 of FIG. 1. Comprised in device 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core designed by Advanced Micro Devices Corporation. Processor 410 may comprise at least one Qualcomm Snapdragon and/or Intel Atom processor. Processor 410 may comprise at least one application-specific integrated circuit, ASIC. Processor 410 may comprise at least one field-programmable gate array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 400 may comprise a near-field communication, NFC, transceiver 450. NFC transceiver 450 may support at least one NFC technology, such as NFC, Bluetooth, Wibree or similar technologies.

Device 400 may comprise user interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a subscriber identity module, SIM, card installable in device 400. A user identity module 470 may comprise information identifying a subscription of a user of device 400, usable in authentication procedures, for example. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention.

FIG. 5 is a flow graph of a method in accordance with at least some embodiments of the present invention. The phases of the illustrated method may be performed in MME 130, for example, or in a control device configured to control the functioning thereof, when installed therein.

Phase 510 comprises establishing, in an apparatus, a user equipment context for a user equipment registered with the apparatus, the user equipment context being associated with an identity of the user equipment. Phase 520 comprises determining that a plurality of network messages comprising the identity of the user equipment as sender fail a network message integrity process. Phase 520 comprises triggering, responsive to the determination, at least one of: 1) sending a paging message to the user equipment and 2) initiating an authentication process with a sender of the network messages, and deletion of the user equipment context as a response to successful completion of the authentication process, and Option 1) thus comprises sending the paging message, and option 2 comprises both initiating the authentication process and deletion of the UE context as a response to successful completion of the authentication process. Successful completion of the authentication process here refers to an outcome where the UE is authenticated as legitimate.

Figure 6:
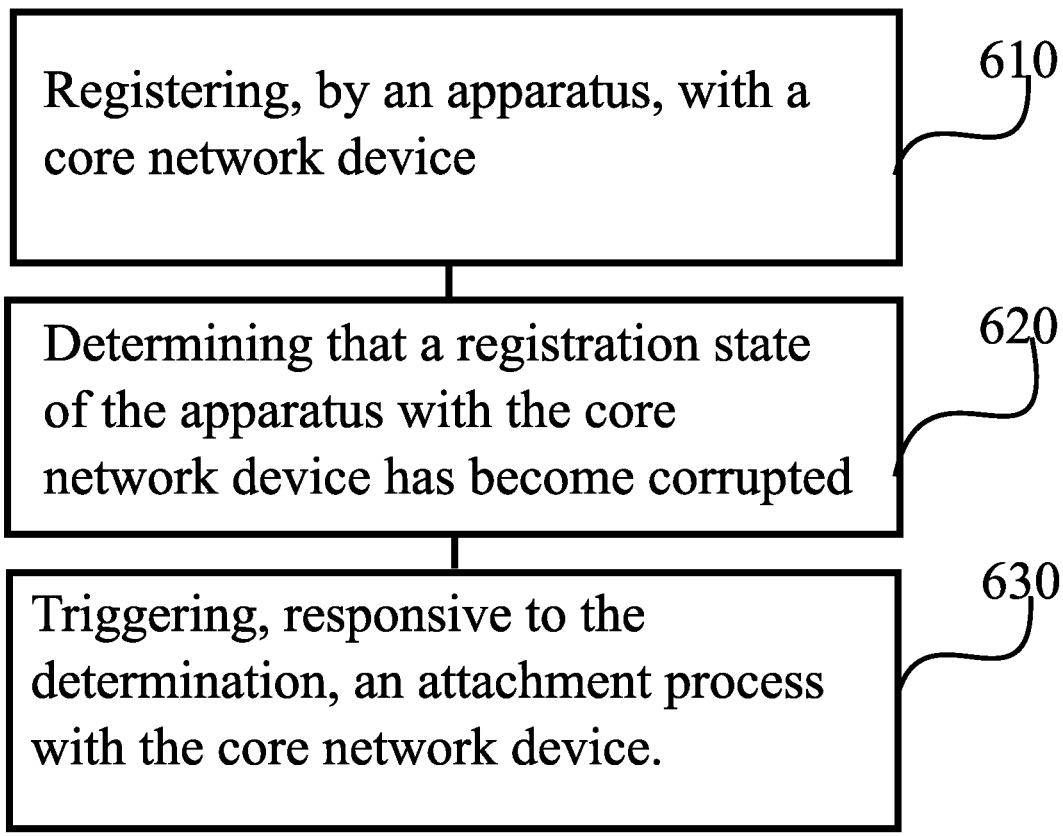
FIG. 6 is a flow graph of a method in accordance with at least some embodiments of the present invention.

FIG. 6 is a flow graph of a method in accordance with at least some embodiments of the present invention. The phases of the illustrated method may be performed in device 110, an auxiliary device or a personal computer, for example, or in a control device configured to control the functioning thereof, when installed therein.

Phase 610 comprises registering, by an apparatus, with a core network device. Phase 620 comprises determining that a registration state of the apparatus with the core network device has become corrupted. Finally, phase 630 comprises triggering, responsive to the determination, an attachment process with the core network device. The core network device may comprise MME 130, as described herein above.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in managing communication networks.

REFERENCE SIGNS LIST

110 Legitimate user equipment, UE
115 Malicious UE
120, 125 Base station
130 MME/AMF
140 HSS/UDM
112, 116 Radio link
123A, 123B, 134 Connection
210-2110 Phases of the method of FIG. 2
310-330 Phases of the method of FIG. 3

400-470 Structure of the device of FIG. 4
510-530 Phases of the method of FIG. 5
610-630 Phases of the method of FIG. 6

The invention claimed is:

1. An apparatus comprising at least one processing core, at least one memory including computer program code, the at least one memory and the computer program code being configured to, with the at least one processing core, cause the apparatus at least to:
   establish a user equipment context for a user equipment registered with the apparatus, the user equipment context being associated with an identity of the user equipment;
   determine that a plurality of network messages comprising the identity of the user equipment as sender fail a network message integrity process; and
   trigger at least one of: 1) sending a paging message to the user equipment, or 2) initiating an authentication process with a sender of the network messages, and deletion the user equipment context as a response to successful completion of the authentication process,
   wherein the apparatus is configured to trigger the sending of the paging message, and wherein the apparatus is configured to process a response from the user equipment to the paging message, and where the response passes the network message integrity process, the apparatus is configured to do a non-access stratum re-keying of the user equipment to create a fresh non-access stratum security context from a current context.

* * * * *